A. M. DOERFLER.
DEMOUNTABLE RIM FOR WHEELS.
APPLICATION FILED JUNE 2, 1916.

1,270,022.

Patented June 18, 1918.
2 SHEETS—SHEET 1.

INVENTOR:
Alfred M. Doerfler
By
his attorneys.

A. M. DOERFLER.
DEMOUNTABLE RIM FOR WHEELS.
APPLICATION FILED JUNE 2, 1916.

1,270,022.

Patented June 18, 1918.
2 SHEETS—SHEET 2.

INVENTOR=
Alfred M. Doerfler.
By
Coale H Hay
his attorneys.

UNITED STATES PATENT OFFICE.

ALFRED M. DOERFLER, OF MEDFORD, MASSACHUSETTS.

DEMOUNTABLE RIM FOR WHEELS.

1,270,022.   Specification of Letters Patent.   Patented June 18, 1918.

Application filed June 2, 1916. Serial No. 101,400.

*To all whom it may concern:*

Be it known that I, ALFRED M. DOERFLER, of Medford, in the county of Middlesex and State of Massachusetts, a citizen of the United States, have invented a new and useful Improvement in Demountable Rims for Wheels, of which the following is a full, clear, and exact description, reference being had to the accompanying drawings, forming a part of this specification, in explaining its nature.

The present invention relates to improvements in demountable rims for wheels and especially to wheels having a quick detachable tire.

Among the objects of my invention is to provide whereby the tire may be quickly and easily applied to the demountable rim or removed from it and like facility be obtained in applying the demountable rim to the wheel or fixed rim or removing it therefrom; to provide a demountable split rim in which the separate parts are held together without bolts, nuts or like fastenings; to provide whereby the fastenings for the separate parts of the demountable rim are socketed within the fixed rim and reinforced and held by it; to provide a structure that will not rattle, creak or shake loose and in which, also, wear may be taken up; to provide a compact structure in which the demountable rim may fit snugly over the fixed rim, and essentially to provide a structure in which the tire will be securely held on the demountable rim and the demountable rim also securely fixed to the fixed rim, the jointed engagement of all the parts being such as to be self-tightening so as to obtain a tight and proper union between them at all times.

My invention can best be seen and understood by reference to the drawings in which I have shown an embodiment thereof applied to a wheel and tire of a common type and in which—

Referring to the drawings:—

Figure 1:
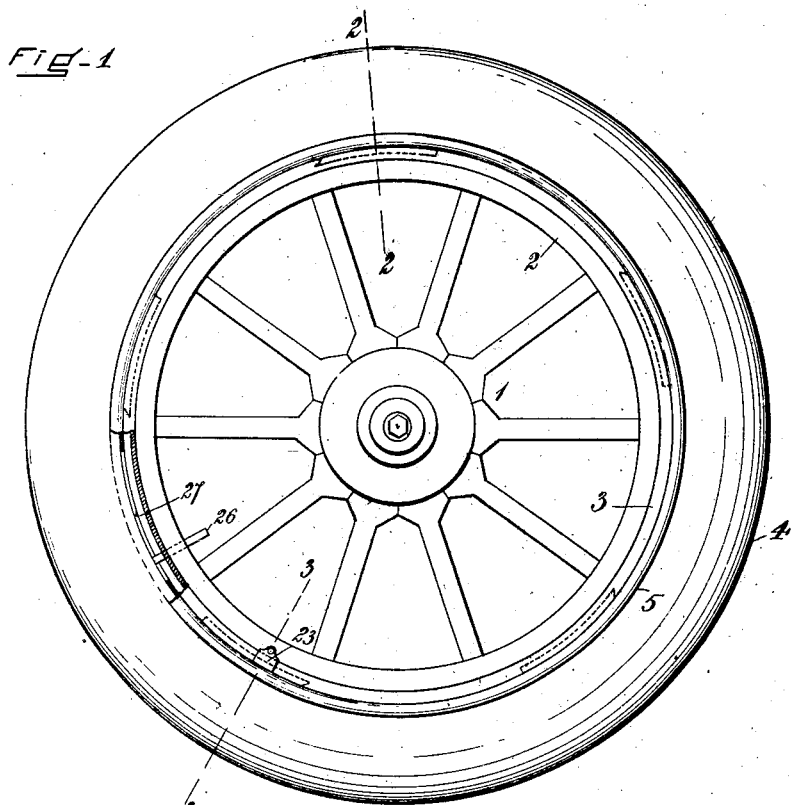
Figure 1 is a view in side elevation of the structure.
Figure 2:
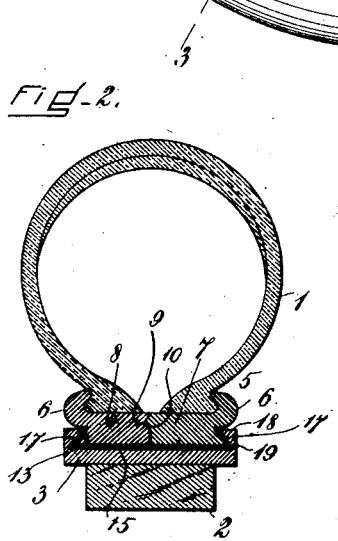
Fig. 2 is a section on the line 2—2 of Fig. 1.
Figure 3:
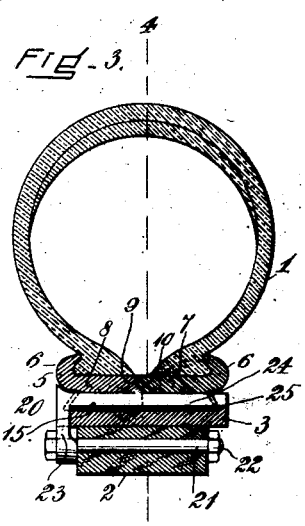
Fig. 3 is a section on the line 3—3 of Fig. 1.
Figure 4:
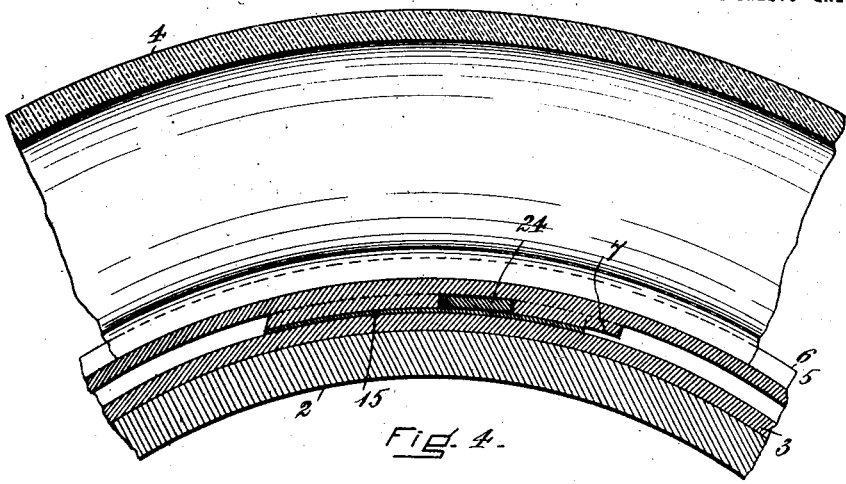
Fig. 4 is a section on the line 4—4 of Fig. 3.
Figure 5:
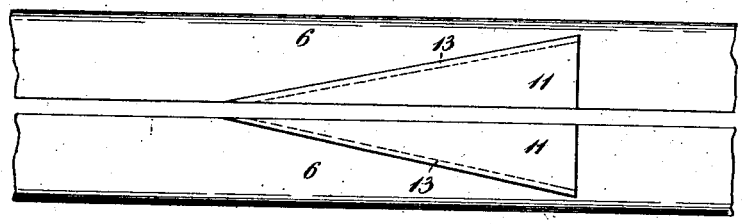
Fig. 5 is a plan of the under side of the rim of the tire.
Figure 6:
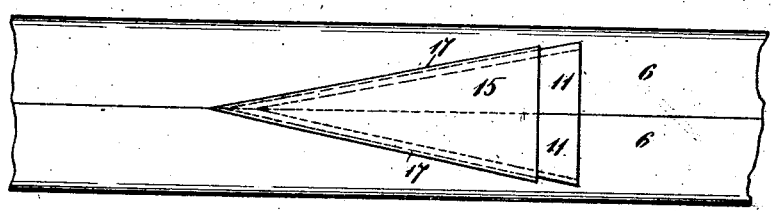
Fig. 6 is also a plan of the under side of the demountable rim having applied to it a locking device to which reference will later be made.

1 represents the body of the wheel having an ordinary wooden felly 2 to which the spokes are secured and which is faced with a fixed annular metal rim 3.

4 represents the shoe or pneumatic tire. 5 is the demountable rim which is provided with the usual flanged edges 6 which embrace the tire for holding it securely in place.

The rim 5 of the shoe or tire is split longitudinally comprising, in other words, separate parts or sections 7 and 8, respectively. These sections are substantially identical and oppositely disposed. The inner edge of one of the sections 7 is provided with an annular V or wedge-shaped projection 9 and the inner edge of the section 8 with a corresponding V or wedge-shaped socket 10 into which the projection 9 fits when the two parts or sections are brought together to embrace and hold the tire, the socketing of the projection 9 in the other part or section acting to center the two sections in proper position with relation to one another and to the tire.

The parts 7 and 8 of the demountable rim are each provided on the inner side or face thereof with raised pieces 11 which coöperate with one another to form a series of spaced raised but relatively thin wedge-shaped cleats. These cleats are arranged on the inside of the rim of the tire and lie preferably equidistant from one another. The side edges 13 of the cleats are inclined inwardly.

Adapted to fit over each of the respective cleats are corresponding wedge-shaped caps 15. These caps are made of relatively thin or sheet metal and comprise a flat wedge-shaped body portion provided with flanged edge portions 17 running from the base of each cap to the apex. The flanged edges 17 of the caps are inwardly inclined and have, in other words, substantially the same inclination as the side edges of the cleats. The caps fit upon the cleats with a drawing engagement, the application of the caps tending to exert lateral pressure or draft upon the separate pieces comprising the cleats, thereby drawing them together and with them the two parts or sections of the demountable rim for holding the tire.

On account of the inclination of the sides of the cleats and likewise of the caps, the caps are enabled to have interlocking engagement with the cleats as against displacement in radial direction.

Formed within a series of raised or thickened portions 18 of the fixed rim 3 of the wheel are a like series of V-shaped, relatively shallow sockets 19 having inclined or beveled side edges like the caps which fit within these sockets. The raised portions 18 are formed on the outer side or face of the rim, and accordingly the sockets formed within them are sockets raised above the normal peripheral face of the rim. The sockets 19 extend circumferentially around the rim 3; they correspond in number with the cleats on the demountable rim and are spaced equidistant from one another, the spacing corresponding with the spacing between the cleats. In other words, the spaced relationship between the cleats and sockets is such that after the caps have been applied to the cleats the demountable rim and tire carried by it may be applied by axial movement to the fixed rim of the wheel, the cleats and caps thereon then passing in the space between the socket-forming portions 19 of the wheel rim. After the cleats and caps have been moved to a position in alinement with the sockets, then by turning the demountable rim circumferentially with relation to the fixed rim the cleats with the caps upon them will turn into and become fixed within the wedge-shaped sockets. The fixed rim, with the caps thus socketed, will act to hold the caps in place and also reinforce them in their retention of the separate parts of the demountable rim. The fixed rim will also act to hold the demountable rim securely against both lateral and radial displacement and also against circumferential displacement in one direction. In order that all the cleats with the caps thereon may fit properly within the sockets of the fixed rim, the relative spacing of the cleats and sockets should be accurately obtained and all of the caps should be properly applied to the cleats. In practice the proper application of any cap to a cleat is indicated by the cap being drawn or forced onto the cleat until the base portion of the cap is in alinement with the base portion of the cleat.

In connection with the socketing of the cleats and caps the direction in which the sockets point is such that after the demountable rim has been applied to the fixed rim of the wheel the draft exerted upon the wheel, as the vehicle to which the wheel is attached moves in a forward direction, will tend to force the cleats and caps into their respective sockets on the fixed rim. That is, during the ordinary movement of the vehicle to which the wheel is applied the forces are such as to make the cleats and caps tighten into their respective sockets, thereby constantly acting to take up any lost motion in the various joints and eliminate all creaking or rattling. Any tendency to displacement would occur only as the wheel was moved in a reverse direction as by the backing of the vehicle. Such displacement is prevented and the demountable rim is locked upon the fixed rim against circumferential displacement in both directions by means of a locking device 20. This is secured to the felly of the wheel by a bolt 21 extending through the felly and secured by a nut 22. Fastened to this bolt at one end is a fixture 23 carrying a finger or key 24 which extends into a slot 25 extending through one of the raised socket-forming portions 18 of the wheel rim and also through the side walls of the cap and through the cleat contained within this socket, the parts being fashioned to receive the locking finger or key.

The manner of attaching a tire to a wheel and removing it therefrom is as follows:—

In applying the tire to a wheel the sectional parts 7 and 8 of the demountable rim are first applied to the opposite sides of the tire and in such manner that the raised pieces 11 of the respective parts may properly coöperate with one another to form the series of cleats. The locking caps are then applied to the cleats, being forced thereon in any suitable manner. The demountable rim is then applied axially to the fixed rim of the wheel as before explained and the parts turned circumferentially with relation to one another until the cleats with the caps thereon fit properly within their respective sockets on the fixed rim of the wheel. The locking device 20 is then applied to the wheel by passing the bolt 21 through the felly of the wheel and the finger or key 24 into the socket made to receive it, after which the locking device is secured in place by applying the nut 22 to the end of the bolt and tightening the same against the felly of the wheel.

The removal of the tire and rim carrying the same is obtained simply by a reverse operation, the nut 22 first being removed from the locking device, which may then be withdrawn from the wheel. Then by a relative circumferential movement between the demountable and fixed rims the cleats with the caps thereon may be moved out of their respective sockets to a position where the detachable rim with the tire thereon may be withdrawn simply by an axial movement.

Owing to the fact that in obtaining the attachment and detachment of the demountable rim to and from the fixed rim a relative circumferential movement must be obtained, some provision must be made for the neck 26 of the valve of the tire which ordinarily extends through the demountable rim and also through the fixed rim and felly of the wheel when the demountable rim is in place. To provide accordingly for such relative circumferential movement between the parts and also for the taking care of the neck of the valve a slot 27 is formed in the fixed rim of the wheel and felly thereof along which the neck of the valve may slide during the relative circumferential movement of the combined parts.

While I have shown an embodiment of my invention applied to a wheel of a well known type with a pneumatic tire, it is obvious that the same kind of connection may be used in wheels of a different type.

Having thus fully described my invention, I claim and desire to secure by Letters Patent of the United States:—

1. A demountable wheel rim having parts separated by a split in said rim, each of said parts having upon it pieces coöperating with one another to form a wedge shaped cleat and a wedge shaped cap fitting over said cleat for uniting the separate pieces thereof and thereby holding together the separated parts of the rim.

2. A demountable wheel rim having separate parts, each having upon it pieces coöperating with one another to form a series of spaced, wedge-shaped cleats, and wedge-shaped caps fitting over said cleats for uniting the separate pieces thereof with a drawing action and holding together the separate parts of the rim.

3. A demountable wheel rim split longitudinally into separate parts, each part having upon it cleat-forming members coöperating with one another to form a series of relatively thin wedge-shaped cleats, and wedge-shaped, flanged plates capping said cleats for uniting the separate pieces thereof and holding together the separate parts of the rim.

4. A demountable wheel rim having separate parts, each having upon it pieces coöperating with one another to form a series of spaced, wedge-shaped cleats, and wedge-shaped, flanged caps drawn over said cleats, uniting the separate pieces thereof and having an interlocking engagement with the cleats as against displacement in a radial direction.

5. A demountable wheel rim split longitudinally into separate parts, each of said parts having upon it projecting pieces coöperating with one another to form a series of relatively thin, flat, wedge-shaped cleats having inturned side edges, and wedge-shaped caps of thin metal having inturned side edges drawn over said cleats.

6. A demountable wheel rim split longitudinally into separate parts, said parts presenting meeting edges having a self-centering engagement with one another as the edges of the respective parts are drawn together, each of said parts having upon it raised pieces coöperating with one another to form a series of spaced, wedge-shaped cleats, and wedge-shaped caps drawn over said cleats.

ALFRED M. DOERFLER.